United States Patent [19]

Pollnow, Jr.

[11] 4,125,782
[45] Nov. 14, 1978

[54] DEMAND/SCHEDULE CONTROLLER

[75] Inventor: Harold J. Pollnow, Jr., Dousman, Wis.

[73] Assignee: Allen-Bradley Company, Milwaukee, Wis.

[21] Appl. No.: 768,859

[22] Filed: Feb. 15, 1977

[51] Int. Cl.² .............................................. H02J 3/14
[52] U.S. Cl. ...................................... 307/35; 307/38; 307/34; 364/900
[58] Field of Search ............... 307/35, 38; 235/151.21; 324/103 R; 364/493

[56] References Cited

U.S. PATENT DOCUMENTS

| | | | |
|---|---|---|---|
| 3,862,430 | 1/1975 | Lenhart | 307/35 |
| 3,906,242 | 9/1975 | Stevenson | 235/151.21 |

Primary Examiner—L. T. Hix
Assistant Examiner—S. D. Schreyer
Attorney, Agent, or Firm—Quarles & Brady

[57] ABSTRACT

A demand controller includes a microprocessor which is programmed to input data from switches on a control panel and output data to a set of eight circuits which control the operation of loads. Peak power demand is maintained below a preset DEMAND OBJECTIVE by selectively shedding these loads. The shed level for each load is not fixed, but instead, varies as a function of the rate at which total power demand is increasing. This rate is calculated by the microprocessor and the resulting shed level index ($i$) is employed to select the proper shed level for each load from a stored shed level matrix.

7 Claims, 15 Drawing Figures

Fig. 8

| | 0 | 2 | 4 | 6 | 8 | A | C | E |
|---|---|---|---|---|---|---|---|---|
| 0 | 95 | 96 | 97 | 97.5 | 98 | 98.5 | 99 | 99.5 |
| 2 | 93 | 95 | 96 | 97 | 97.5 | 98 | 98.5 | 99 |
| 4 | 90 | 93 | 95 | 96 | 97 | 97.5 | 98 | 98.5 |
| 6 | 86 | 90 | 93 | 95 | 96 | 97 | 97.5 | 98 |
| 8 | 81 | 86 | 90 | 93 | 95 | 96 | 97 | 97.5 |
| A | 75 | 81 | 86 | 90 | 93 | 95 | 96 | 97 |
| C | 68 | 75 | 81 | 86 | 90 | 93 | 95 | 96 |
| E | 60 | 68 | 75 | 81 | 86 | 90 | 93 | 95 |

ROW DIGITS (vertical axis), COLUMN DIGITS (horizontal axis)

LOAD NO. 2 MATRIX POINTER: C 2

DEMAND/SCHEDULE CONTROLLER

BACKGROUND OF THE INVENTION

The field of the invention is control systems for managing electrical power consumption by industrial and commercial users, and more particularly, load demand controllers for limiting the amount of power consumed during a time interval.

Because power companies charge for "peak" power consumption as well as "total" power consumption, considerable savings can be achieved by limiting the use of electricity during periods of high demand. Control systems for accomplishing this task monitor the power consumption of the user and when a preselected peak, or "demand limit," is approached, one or more nonessential loads are shut down, or "shed." When demand subsides, these loads are brought back on line, or "restored." A basic design objective of such controllers is to minimize the disruption of power to the interruptible loads while at the same time not exceeding the demand limit. In other words, under any given set of circumstances loads are not to be shed unless necessary, the minimum possible number of loads to be shed, and the interrupted loads are to be restored to operation as soon as possible.

There are three basic types of load demand controllers: instantaneous controllers; ideal rate controllers; and predicting controllers. The instantaneous controllers monitor the power usage on a continuous basis and shed loads based on the instantaneous power consumption. Because power companies determine peak demand over a "demand interval" which is typically measured in minutes rather than on the basis of instantaneous demand, the instantaneous demand controller will often shed loads to limit instantaneous demand when it would not have been necessary to do so if the total demand interval had been considered.

The second type of demand controller is the predicting type. Such controllers employ general purpose computers which are programmed to measure the power usage at a predetermined time within each demand interval and based on the preselected demand limit, the time of day, past experience, and other factors, it predicts what the total power demand for that demand interval will be. If needed, loads will be shed or restored to maintain power consumption near the demand limit. In addition to the high cost of the hardware for such predicting type demand controllers, the programming of them is time consuming and costly.

The third general type of demand controller is the ideal rate type controller. In such a controller pulses are received from the electric meter at a rate proportional to power consumption. This pulse rate is compared with an "ideal" pulse rate, which if maintained throughout the demand interval would exactly equal the demand limit. The loads are shed or restored based on the difference between the ideal rate and the actual power consumption rate. For each load connection to the controller a shed rate and a restore rate is established and an offset adjustment is provided to inhibit load shedding early in the demand interval. The "programming" of such a demand controller requires considerable information about each load device and a number of calculations using this information must be made. The meaning of the various settings and readouts on the controller is far from obvious and requires considerable study.

SUMMARY OF THE INVENTION

The present invention relates to a demand controller, and particularly, a demand controller of the ideal rate type in which the shed and restore points are automatically determined for each load device as a function of the present rate of power consumption. A set of predetermined shed points are stored in a memory for each load connected to the controller. Based on the present rate of power consumption, one of these shed points is selected and compared with the actual rate of power consumption to determine whether or not its associated load should be shed.

Present power consumption is calculated as a percentage of demand limit, or "demand objective," and the predetermined shed points are also stored as a percentage of demand objective. The display of present power consumption or highest power consumption during previous demand intervals is thus made in percentage of demand objective which is easily and quickly comprehended by the user.

A general object of the invention is to provide a means for automatically setting the shed points for the loads on a demand controller. A shed level index is calculated based on the present rate of change of power consumption and in a preferred emobidment is calculated by dividing present power consumption rate by the power consumption rate over the most recent demand interval. A shed level is then selected from a set of stored shed levels based on the magnitude of the shed level index. Higher magnitudes of calculated shed level index indicate that power consumption is rising more rapidly and that lower shed levels are required to maintain total demand below the demand objective. Conversely, lower calculated values of the shed level index indicate little or no increase in total demand and the selected shed level for each load is relatively high.

Another object of the invention is to automatically set the restore level for each load. A "shed-restore differential" number is manually selected and after the shed level for each load is automatically selected, the restore level is calculated by subtracting the shed-restore differential therefrom. In the preferred embodiment of the invention the shed-restore differential number is selected by the user and applies to all of the controlled loads.

Another object of the invention is to provide an efficient and durable demand controller which is relatively inexpensive to manufacture. A microprocessor is employed to perform the calculations and to couple data between the various system elements. Special purpose hardware is kept to a minimum and the machine instructions which operate the microprocessor along with a shed level matrix are stored in a secure read-only memory.

The foregoing and other objects and advantages of the invention will appear from the following description. In this description reference is made to the accompanying drawings which form a part hereof, and in which there is shown by way of illustration a preferred embodiment of the invention. Such embodiment does not necessarily represent the full scope of the invention, however, and reference is made to the claims herein for interpreting the breadth of the invention.

BRIEF DESCRIPTION OF THE DRAWINGS

FIG. 8 is a schematic representation of a shed level matrix which is stored in a read-only memory that forms part of the controller of FIG. 3, and FIGS. 9–15 are flow charts of the program which controls the operation of a microprocessor that forms part of the controller of FIG. 3.

DESCRIPTION OF THE PREFERRED EMBODIMENT

Figure 1:
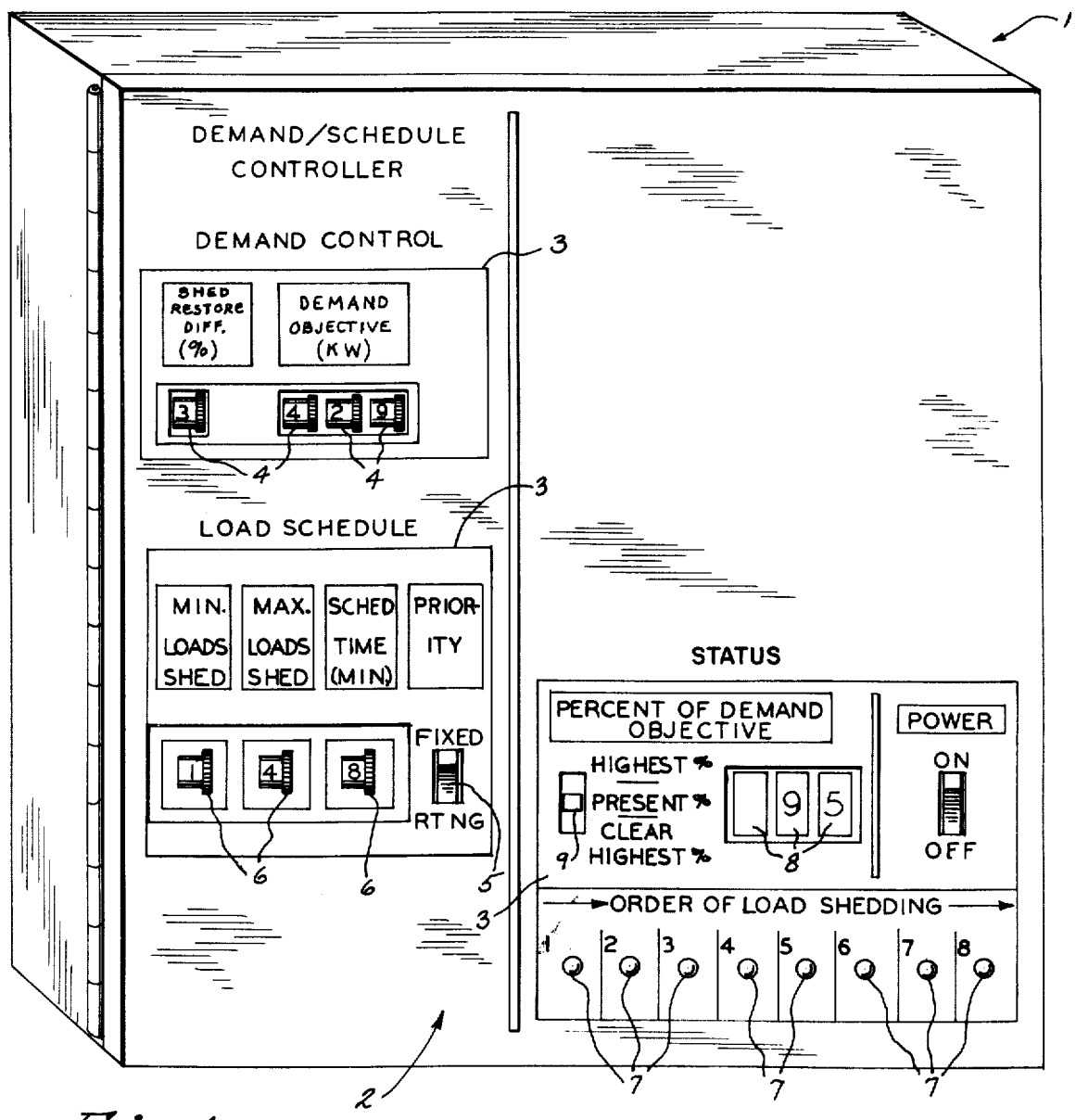
FIG. 1 is a perspective view of the invented demand controller.

Referring to FIG. 1, the demand controller is housed in a cabinet 1 and includes a door 2 which is hinged along its left hand side and which may be swung forward to gain access to the interior. The door 2 provides support for a number of switches and visual indicators which are labeled "DEMAND CONTROL," "LOAD SCHEDULE" and "STATUS," and which are referred to collectively hereinafter as the main control panel 3. The DEMAND CONTROL portion of the control panel is comprised of four thumbwheel switches 4, each of which may be manually set to a value of from zero to nine. One of the switches 4 is set to determine the shed-restore differential and the remaining three switches 4 are set to determine the demand limit, or demand objective, of the control system.

The LOAD SCHEDULE portion of the main control panel 3 is comprised of a single-pole-double-throw "priority" switch 5 and a set of three thumbwheel switches 6. The priority switch 5 is set to select the fixed priority mode of operation or the rotating priority mode of operation. If the rotating mode of operation is selected, the three thumbwheel switches 6 are set to determine the minimum and maximum number of loads which can be shed at any one time (0–9) and the time interval between rotation of the shed loads (0–15).

The STATUS portion of the main control panel 3 includes a set of eight LEDs 7 which provide a visual indication of the state of each of the eight loads connected to the demand controller. The STATUS portion also includes three LED seven-segment displays 8 which provide a three-digit visual indication of either the percentage of the demand objective presently being consumed or the highest percentage of demand objective recorded during past demand intervals. The display 8 is controlled by a single-pole-triple-throw switch 9. The switch 9 may also be depressed to clear the stored highest percentage number.

Figure 2:
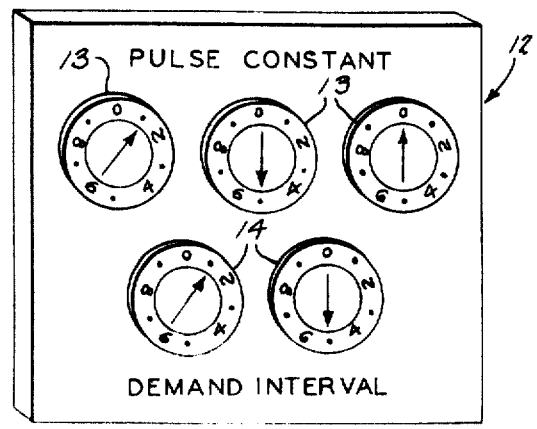
FIG. 2 is a perspective view of an auxiliary control board which is part of the demand controller of FIG. 1.

Referring to FIG. 2, located within the cabinet 1 is an auxiliary control panel 12 which includes five additional ten-digit switches. Three of these switches 13 are set to correspond with the "pulse constant" peculiar to the power meter employed with the demand controller, and two of the switches 14 are set to correspond with the "demand interval" employed by the electric power company. The demand interval is measured in minutes and the switches 14 can be set to values of from one to ninety-nine minutes. The switches 13 and 14 are not likely to be reset once the controller is put in operation, and hence they are not mounted on the main control panel 3.

Figure 3:
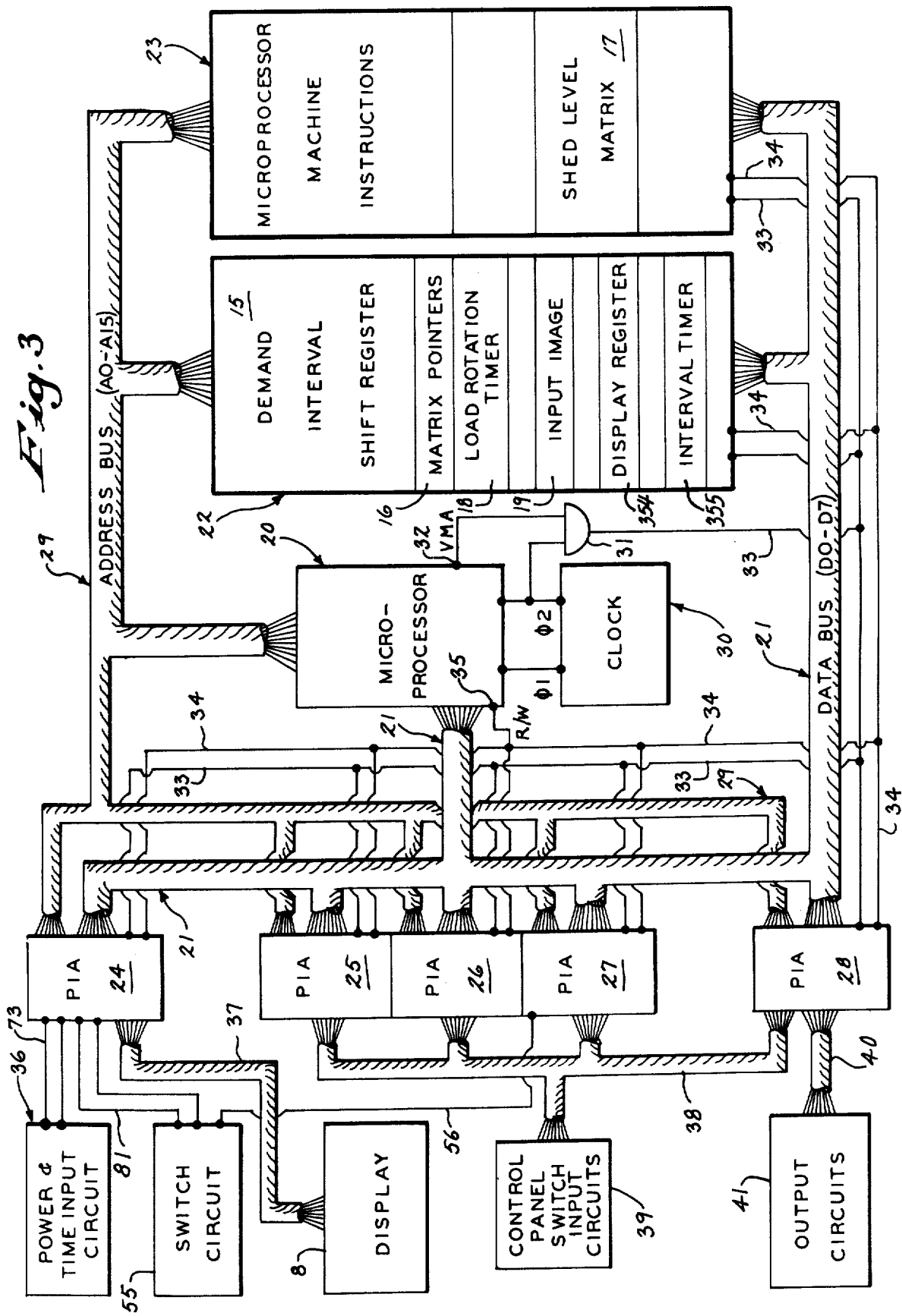
FIG. 3 is an electrical block diagram of the demand controller of FIG. 1.

Referring to FIG. 3, the demand controller is formed around an eight-bit microprocessor 20 which connects to a bidirectional, eight-bit data bus 21 (DO–D7). The data bus 21 connects the microprocessor 20 with a random access memory (RAM) 22, a read-only memory (ROM) 23, and a set of five peripheral interface adapters (PIA) 24–28. A 16-bit address bus 29 also connects to the microprocessor 20 and couples it to each of the above listed system elements. The microprocessor employed in the preferred embodiment of the invention is the Model M6800 manufactured by Motorola Semiconductor Products, Inc. and reference is made to the publications entitled "M6800 Microprocessor Programming Manual" and "M6800 Microcomputer System Design Data" published by the same manufacturer in 1976 for a detailed description of the structure, operation and instruction set of the microprocessor 20. The peripheral interface adapters 24–28 are available from the same manufacturer and are identified as the Model MC6820. Similarly, the RAM 22 is available from Motorola Semiconductor Products, Inc. as Model MCM6810 and the ROM 23 is available as Model MCM6830.

The microprocessor 20 is driven by a two-phase clock 30 which generates two non-overlapping, one megahertz clock pulse trains indentified as $\phi 1$ and $\phi 2$. The $\phi 2$ clock also connects to one input of the AND gate 31 and a second input thereon connects to a "VMA" output 32 on the microprocessor 20. The output of the AND gate 31 connects through a clock line 33 to each of the system elements 22–28, and when a valid address appears on the address bus 29, a logic high voltage is generated thereon during the $\phi 2$ clock interval. The clock 30 in the preferred embodiment is a Model MC6870A which is available from Motorola Semiconductor Products, Inc.

The direction of data flow on the data bus 21 is determined by the state of a read-write control line 34 which connects to a read/write terminal 35 on the microprocessor 20. When driven to a logic high voltage a read operation is performed in which data is coupled through the data bus 21 from one of the system elements 22–28 to the microprocessor 20. When a logic low voltage is generated, a write operation is performed in which data is coupled from the microprocessor 20 through the data bus 21 to the addressed system element. Read and write operations are, of course, under the programmed control of the microprocessor 20 and the system element involved in each data transfer is identified by the 16-bit hexadecimal address on the address bus 29.

The RAM 22 stores up to 128 eight-bit words which are separately addressable through the bus 29 with the addresses 00 to 7F (hexadecimal). These data words may be read out to the microprocessor 20 during a read operation or a new data word may be loaded into an addressed line of the RAM 22 during a write operation. The RAM 22 serves as temporary storage during calculations and it provides a number of registers which will be described in detail hereinafter.

The ROM 23 stores up to 1024 eight-bit words which are separately addressable through the bus 29 with the addresses FC00 to FFFF (hexadecimal). These data words may be read out to the microprocessor 20 during a read operation, but they cannot be written over, or changed, without actually removing and physically altering the memory chip. The ROM 23 stores the microprocessor machine instructions which determine the operation of not only the microprocessor 20, but also the entire demand controller. These machine instructions are stored in the order in which they are to be executed, and they are sequentially addressed by a program counter (PC) within the microprocessor 20. After each machine instruction is executed, the next machine instruction is read from the ROM 23 and loaded into the microprocessor instruction register. The functions performed by the controller in response to the execution of these machine instructions will be explained in detail hereinafter with the use of the flow charts of FIGS. 9-15. The ROM 23 also stores a shed level matrix 17 which is one of the unique elements of the present invention.

The peripheral interface adapters 24-28 provide a universal means of interfacing peripheral devices to the microprocessor 20 through two eight-bit bidirectional data channels, A and B. The direction of data flow is determined by the state of the read-write line 33; that is, when a read operation is performed data is coupled from the periperal device to the data bus 21 and when a write operation is performed, data is coupled from the data bus 21 to the peripheral device. Leads in the address bus 29 connect to each PIA 24-28 to select which, if any, of the five is involved in a data transfer and which channel, A or B, in the selected PIA is involved. The PIAs 24-28 couple the microprocessor 20 to the switches and display devices on the main control panel 2 and the auxiliary control panel 12. Two leads of channel A in the PIA 24 connect to a power and time input circuit 36, two leads connect to a switch circuit 255 and three leads of the same channel and the eight leads of channel B connect through a cable 37 to the seven-segment display 8. Channel A is enabled when hexadecimal address 4040 appears on the address bus 29 and channel B is enabled when hexadecimal address 4041 is present. The A and B channels in the respective PIAs 25, 26 and 27 and the B channel in the PIA 28 connect through a cable 38 to input circuits 39 associated with each of the thumbwheel switches on the main control panel 3 and each of the selector switches on the auxiliary control panel 12. A lead 56 connects the switch circuit 255 to the B channel of PIA 27. The addresses associated with each of the switches are as follows:

| Device | Address (hexadecimal) |
|---|---|
| Demand objective thumbwheel switches 4 | 4010 and 4011 |
| Shed-restore differential thumbwheel switch 4 | 4010 |
| Priority switch 5 | 4101 |
| Minimum loads shed thumbwheel switch 6 | 4100 |
| Maximum loads shed thumbwheel switch 6 | 4100 |
| Schedule time thumbwheel switch 6 | 4101 |
| Pulse constant thumbwheel switches 13 | 4020 and 4021 |
| Demand interval thumbwheel switches 14 | 4081 |

Figure 5:
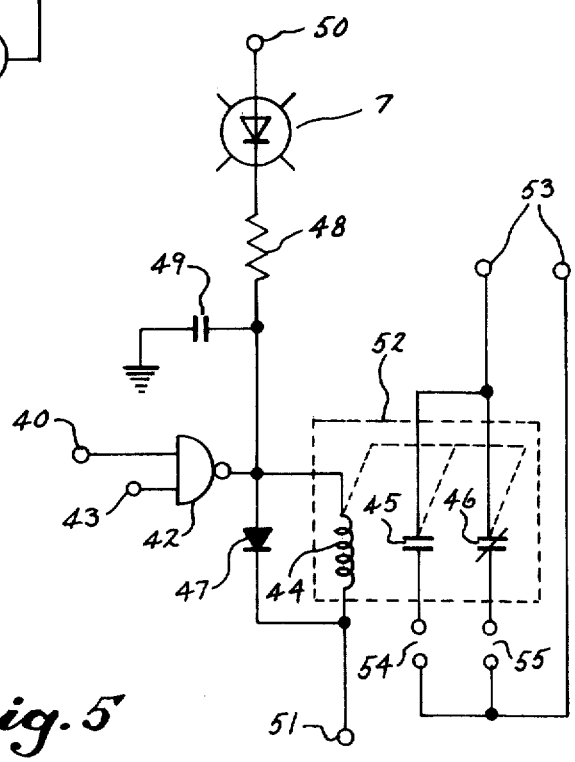
FIG. 5 is an electrical schematic diagram of an output circuit which forms part of the controller of FIG. 3.

The A channel of PIA 28 connects through a cable 40 to a set of eight output circuits 41 that operate the loads controlled by the demand controller. Data is coupled to the output circuits 41 when the hexadecimal address 4080 appears on the address bus 29. As shown in detail in FIG. 5, each of the eight output circuits 41 of FIG. 3 includes a NAND gate 42 having one input connected to a data lead in the cable 40 and a second input connected to a control line 43 which connects to an initialization circuit in the system power supply. The output of the NAND gate drives a relay coil 44 which is magnetically coupled to operate a set of normally open contacts 45 and a set of normally closed contacts 46 when energized. A protective diode 47 is connected in shunt with the coil 44. The output of the NAND gate 42 connects through a resistor 48 to one of the LED indicators 7 and a capacitor 49 connects the NAND gate output to circuit ground. When an output circuit is enabled, or turned on, logic high voltages appear at both NAND gate inputs to drive its output low. Current flows from positive dc supply terminals 50 and 51 to energize the coil 44 and LED 7. The relay indicated by the dashed lines 52 is a general purpose relay rated at 240 volts and 13 amps. The user selects which set of contacts 45 and 46 are to be employed to control a load device connected to output terminals 53 by inserting a jumper at the gap 54 or 55.

Figure 4:
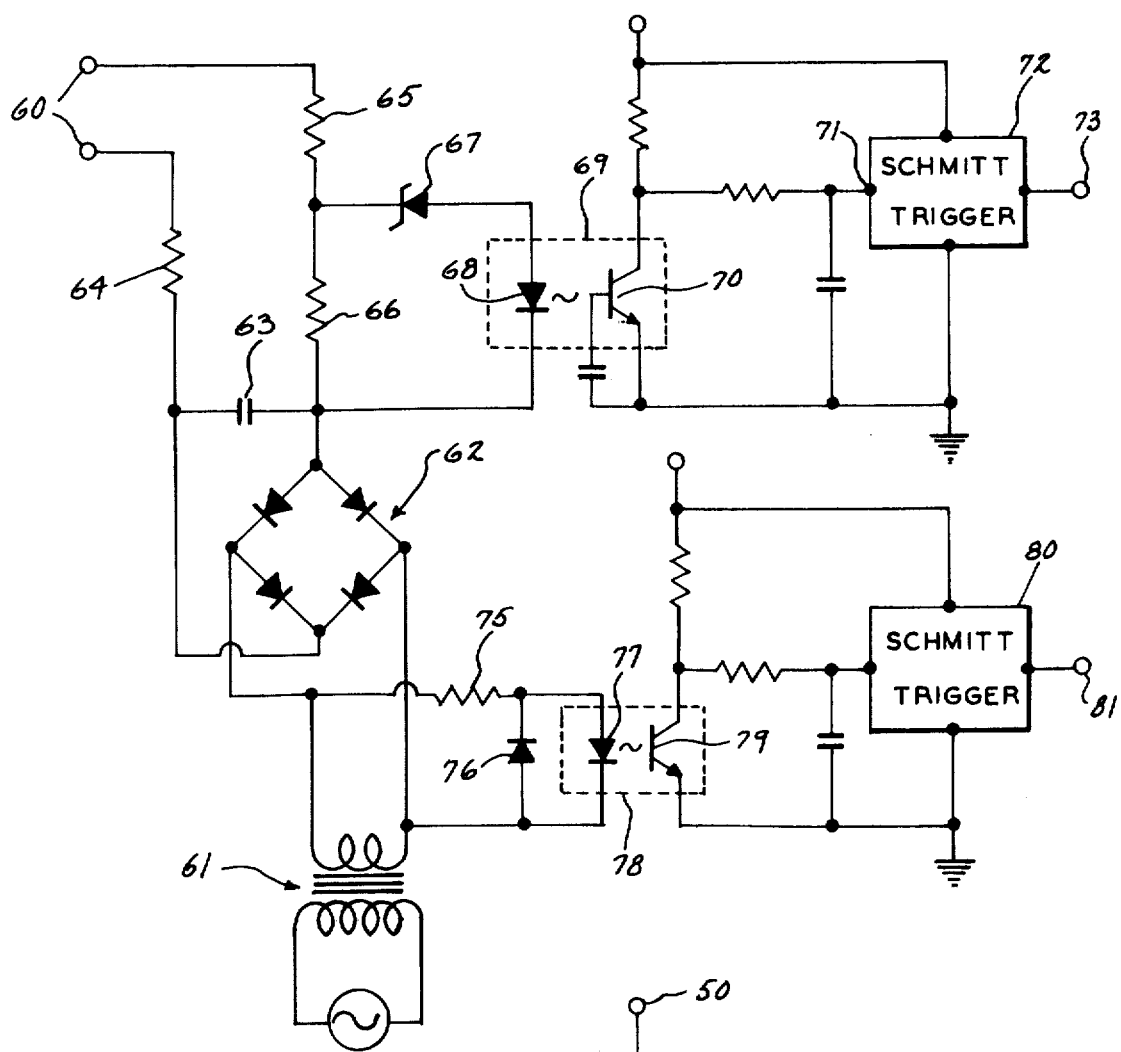
FIG. 4 is an electrical schematic diagram of a power and time input circuit which forms part of the controller of FIG. 3.

Referring particularly to FIG. 4, the power and time input circuit 38 of FIG. 3 includes a set of input teminals 60 which connect to receive an indication of the total power being consumed. Such indication is in the form of pulses which are generated at a rate proportional to power consumption. Each pulse, therefore, represents an increment of power and it is generated by a switch which closes each time that increment of power is consumed. In many cases the wattmeter employed by the electric power company generates suitable pulses for this purpose and the increment of power which each such pulse represents is readily available.

DC power for the power transducer, or wattmeter, is provided by a transformer 61 which drives a full wave bridge rectifier 62. The output of the rectifier circuit 62 if filtered by a capacitor 63 and a filter resistor 64 and is applied to the power transducer through the terminals 60. When a pulse is generated, a voltage drop occurs across resistors 65 and 66 and current flows through the zener diode 67 to the diode portion 68 of an optical isolator 69. The light emitted by the diode portion 68 drives the transistor portion 70 into its conductive state and a logic low voltage is thus applied to an input terminal 71 on a Schmitt trigger 72. The Schmitt trigger 72 inverts this logic low level to a logic high voltage which is applied through a lead 73 to the PIA 24. The zener diode 67 blocks low level noise on the input lines 60 and the Schmitt trigger filters out high level noise spikes of short duration. The optical isolator 69, of course, provides dc isolation.

The input circuit 36 also provides 60 hertz clock pulses to the system which provides an indication of time. More specifically, the primary of the transformer 61 is connected to the power lines to receive the 60 hertz voltage and this is applied through the transducer secondary and resistor 75 to a diode 76 and the diode portion 77 of an optical isolator 78. The transducer portion 79 of the optical isolator 78 is driven into its conductive state for half of each cycle of the applied 60 hertz sine wave and this is inverted by a Schmitt trigger 80 and generated through a line 81 to the PIA 24. Each pulse generated on the line 31 represents 16.667 milliseconds of time and these are accumulated in the RAM 22 as will be described hereinafter.

Figure 6:
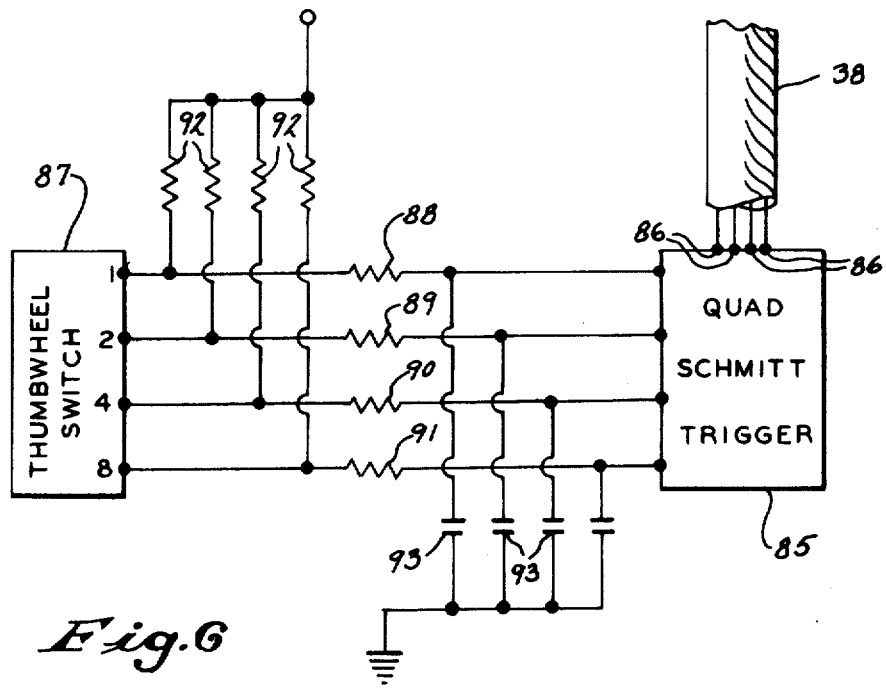
FIG. 6 is an electrical schematic diagram of a control panel input circuit which forms part of the controller of FIG. 3.

Referring to FIGS. 1, 3 and 6, all of the thumbwheel switches on the main and auxiliary control panels 3 and 12 are coupled to the cable 38 through switch input circuits 39. Each such input circuit is illustrated in FIG. 6 and includes a quad Schmitt trigger circuit 85 which has a set of four outputs 86 connected to leads in the cable 38. A Schmitt trigger circuit in integrated circuit form such as the Model CD4093 manufactured by Radio Corporation of America is preferred. Each thumbwheel switch, indicated at 87, has four output terminals which connect through respective resistors 88–91 to four inputs on the Schmitt trigger 85. Pull up resistors 92 connect to the thumbwheel switch outputs the filter capacitors 93 connect each Schmitt trigger input terminal to circuit ground. All of the thumbwheel switches with the exception of the schedule time switch 6 generate a four-bit BCD digit at its outputs which corresponds with its setting. The schedule time switch 6 generates a four-bit binary number at its outputs. In either case, the four-bit number is filtered to eliminate noise and is applied to four leads in the cable 38.

Figure 7:
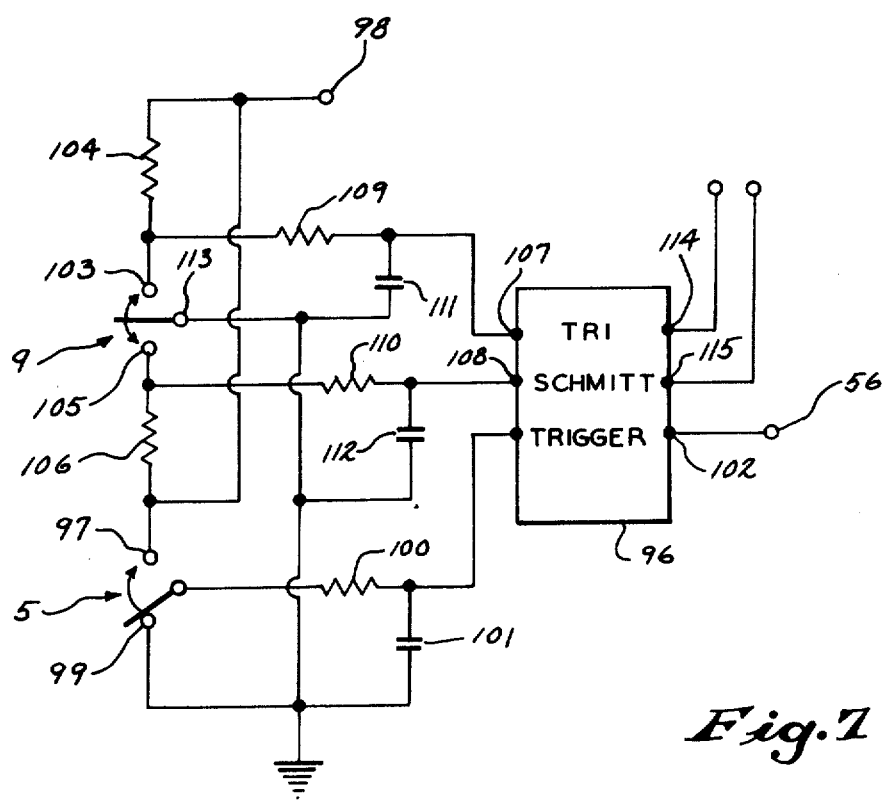
FIG. 7 is another electrical schematic diagram of a control panel input circuit.

Referring to FIGS. 1, 3 and 7, the switch circuit 255 couples the priority switch 5 and the triple throw switch 9 to the system through a tri-Schmitt trigger 96. The switch 5 has one stationary contact 97 connected to a source of logic high voltage 98 and its other stationary contact to signal ground. The movable contact on the switch 5 couples through a resistor 100 to one input on the tri-Schmitt trigger 96 and a filter capacitor 101 connects that input to signal ground. The logic state (high or low) of the output terminal 102 on the Schmitt trigger 96 thus indicates the position of the switch 5 and is coupled through lead 56 to PIA 27. The triple throw switch 9 has one of its stationary contacts 103 connected to the logic high voltage terminal 98 through a resistor 104 and its other stationary contact 105 connected to the terminal 98 through a resistor 106. The stationary contacts 103 and 105 connect to respective Schmitt trigger inputs 107 and 108 through resistors 109 and 110 and the inputs 107 and 108 are coupled to circuit ground by capacitors 111 and 112. The movable contact 113 on the switch 9 connects directly to signal ground. When the movable contact is in its middle position, both inputs 107 and 108 on the Schmitt trigger are held at a logic high voltage and their corresponding outputs 114 and 115 are low. When the movable contact 113 is swung to either stationary contact 103 or 105, the corresponding Schmitt trigger output terminal 114 or 115 goes to a logic high voltage. The outputs 114 and 115 connect to PIA 24.

Stored on the first ninety lines of the RAM 22 is a demand interval shift register 15. Each line of the register 15 stores two BCD digits which represent the number of pulses received at the power input circuit 36 during a time segment equal to one-ninetieth of the preset DEMAND INTERVAL. The 90 lines in the register 15 thus store the number of power pulses received during the most recent DEMAND INTERVAL with the most recent time segment stored at address 00, and the previous time segments stored thereafter. Each of these 90 numbers represents an increment of consumed power and the arithmetic total of all ninety lines represents the power consumed during the last DEMAND INTERVAL. As time passes, the contents of each shift register line is shifted to the next highest address to make room at address 00 for the most recent power increment number. The power increment numbers which are thus shifted out of the highest line of the demand interval shift register 15 are eventually discarded.

Stored in the RAM 22 are memory addresses 005A-0061 (hexadecimal) are eight lines of matrix pointers 16. Each pointer is comprised of one hexadecimal digit which identifies a column (0, 2, 4, 6, 8, A, C, E) in the shed level matrix 17 stored in the ROM 23, and a second hexadecimal digit which identifies a row number (0, 2, 4, 6, 8, A, C, E). As will be described in more detail hereinafter, the two digits in each matrix pointer 16 identifies, or selects, a "shed level number" located in the eight-by-eight shed level matrix 17. Each of the eight matrix pointers 16 is associated with one of the eight loads connected to the output circuits 41 and, therefore, the shed level for each controlled level is selected from the shed level matrix 17 by the contents of its associated matrix pointer 16.

Stored at RAM addresses 0062 and 0063 (hexadecimal) is a load rotation timer 18. The load rotation timer 18 is a 16-bit binary number which represents the number of 60 hertz pulses received from the time input circuit 36 since the loads were last rotated. This timer becomes pertinent only when the priority switch 5 is in the "RTNG" position, in which case the time represented by the number of pulses stored therein is compared with the "SCHEDULE TIME" preset through the thumbwheel switch 6. When the contents of the timer 18 is equal to or greater than the preset SCHEDULE TIME, the loads are rotated as will be described hereinafter.

Stored at RAM address 0065 (hexadecimal) is an output image 19. Each of the eight bits in this image 19 corresponds to one of the eight controlled loads, and their state (1 or 0), corresponds to the state (energized or deenergized) of their corresponding load. This output image 19 is periodically coupled through the PIA 28 to the output circuits 41. If load number one is to be shed, for example, the state of the least significant bit in the output image 19 is changed to a logic 0. The output image 19 is subsequently read out of the RAM 22 and coupled to the output circuits 41 to deenergize the relay 52 therein which controls load one.

Five lines in the RAM 22 commencing at address 006A (hexadecimal) comprise the display register 354. Two of these lines store three BCD digits which represent the highest recorded power consumption since the triple throw switch 9 was last depressed to its "CLEAR HIGHEST PERCENT" position. The recorded power is expressed as a percentage of the "DEMAND OBJECTIVE" which is entered through the thumbwheel switches 4. If the demand objective has been exceeded during any previous demand interval this HIGHEST PERCENT NUMBER will exceed 100. The HIGHEST PERCENT NUMBER is read out of the RAM 22 to the display 8 when the triple throw switch 9 is lifted upward. The last three lines of the display register 354 stores a four-digit BCD number which represents the power presently being consumed. Again, it is expressed as a percentage of the present demand objective number. This number, referred to hereinafter as "PRESENT POWER CONSUMPTION," is periodically read out of the RAM 22 to the display 8 when the triple throw switch 9 is left in its center, or neutral, position.

And finally, stored at memory addresses 0072 and 0073 (hexadecimal) in the RAM 22 is an interval timer 355. The timer 355 is a 16-bit binary number which represents the number of 60 hertz pulses received from the time input circuit 36 since the timer was last reset to zero. When the number of pulses in the timer 355 reaches an amount which represents a time equal to one ninetieth of the DEMAND INTERVAL indicated on the switches 14, it is reset to zero. It is the interval timer 355 which defines when a time segment has occurred and initiates a number of events including the shifting of the contents of the shift register 15.

Referring to FIG. 3, power pulses received through the input circuit 36 provide an indication of the power being consumed. These are accumulated in line one of the demand interval shift register 15 over an increment of time which is measured by the interval timer 355. At the end of each time increment, the contents of the demand interval shift register 15 are shifted to the next highest line and, therefore, the successive lines therein store a profile of the power consumed during an entire DEMAND INTERVAL. The sum of all ninety lines in the register 15 is a measure of the total power presently being consumed per demand interval, and it is this value which is to be kept beneath the "DEMAND OBJECTIVE" setting on the thumbwheel switches 4. This is accomplished, of course, by shedding loads connected to the output circuits 41 when the total power presently being consumed approaches the DEMAND OBJECTIVE.

Unlike prior rate controllers, however, the shed points for each load are not fixed, but instead, are changed as a function of the power consumption profile stored in the register 15. More specifically, the rate at which power was consumed in the most immediate nine time increments is compared with the rate at which power was consumed over the entire DEMAND INTERVAL, or ninety time increments. This comparison provides an indication of the rate at which power consumption is rising or falling. It is a discovery of the present invention that when power consumption is rising slowly toward the DEMAND OBJECTIVE, that loads can be shed at a later time, or in other words, closer to the DEMAND OBJECTIVE than would be the case if power consumption were increasing at a rapid rate. Accordingly, the present invention contemplates the calculation of a shed level index ($i$) which reflects the rate at which power consumption is increasing or decreasing. This index ($i$) is employed to select a shed level number from a matrix of stored shed level numbers for each load connected to the demand controller. A higher calculated value for the shed level index ($i$) indicates a high rate of increase in power consumption and the selection of a lower shed level number is, therefore, made.

The shed level numbers are stored as a percentage of demand objective and the controller compares the selected shed level number for each controlled load with the PRESENT POWER CONSUMPTION. The PRESENT POWER CONSUMPTION is calculated by dividing the total power consumed over the past DEMAND INTERVAL (i.e., the sum of all lines of the demand interval shift register 15) by the DEMAND OBJECTIVE. When the PRESENT POWER CONSUMPTION exceeds the selected shed level for a particular load, the status bit in the output image 19 is set to a logic zero state that this is subsequently coupled to the output circuits 41.

The restore point for each load is determined in part by the shed level number and in part by the setting on the "SHED-RESTORE DIFFERENTIAL" thumbwheel switch 4 on the main control panel 2. Specifically, the restore point is calculated by subtracting the SHED-RESTORE DIFFERENTIAL percentage from the selected shed level number. The "RESTORE LEVEL" for each load is, therefore, always a preset percentage below the shed level for the same load. However, over a period of time it varies as a function of the rate of change of power consumption just as it associated shed level. For example, with a SHED-RESTORE DIFFERENTIAL setting of 3 percent and a high positive rate of change of power consumption ($i > 0.16$) the shed level for a given load may be 90 percent. At the same instant, the restore level for the same load is 87 percent. In practice, a finite amount of time is required before the power demand reaches its peak and drops toward the 87 percent level. During this interim the rate of change of power consumption changes and hence the shed and restore levels will probably change for that load before total power consumption drops back to the 87 percent level. For example, if power consumption should level off after the load is shed at the 90 percent level (i.e., causing the shed level index ($i$) to decrease), the restore point may be changed to as high as 95.5 percent.

Referring to FIGS. 3 and 8, the shed level matrix 17 stored in the ROM 23 is an eight-by-eight matrix which includes eight columns that are identified by successive even hexadecimal column digits 0–E and eight rows that are identified by successive even hexadecimal row digits 0–E. Associated with each of the eight loads connected to the output circuits 41 is one of the eight matrix pointers 16 stored in the RAM 22. A column digit in each matrix pointer 16 identifies a column in the matrix 17 and a row digit therein identifies a row in the matrix 17. The two hexadecimal digit matrix pointers 16 thus identify a shed level number for its associated load. As will be described in detail hereinafter, the shed level index ($i$) is employed to select the row digit in each matrix pointer 16, and it is in this sense that the shed level index ($i$) is said to select the shed level for each controlled load. In the example shown in FIG. 8, matrix pointer 16 indicates that load two has a shed level number of 75 percent. That is, when the PRESENT POWER CONSUMPTION reaches or exceeds 75 percent of the DEMAND OBJECTIVE, the demand controller will shed load two. With a SHED-RESTORE DIFFERENTIAL setting of 3 percent, load two will be restored to operation when the PRESENT POWER CONSUMPTION drops to 72 percent.

Referring particularly to the shed level matrix 17 in FIG. 8, it should be readily apparent that the shed level for any given row in the matrix increases from left to right. In row "C," for example, the shed level ranges from 68 percent ot 96 percent. It should be apparent, therefore, that the column digit determines the load priority. That is, loads which are assigned high column digits are assigned the highest shed level and, therefore, are the last to be shed and the first to be restored in a given situation. When the priority switch 5 on the main control panel 2 is set to "FIXED," the successive loads one through eight are assigned the successive column digits 0–E and these remain unchanged during the operation of the system. If the priority switch 5 is set to "RTNG," however, the load priority assignments are periodically rotated by rotating the column digits in the matrix pointers 16. The time interval between such rotations is set by the "SCHED. TIME" thumbwheel switch 6.

The row digits in the eight matrix pointers 16 are the same at any instant in time and the selection thereof is a function of the shed level index ($i$). The assignment of row digits is made on the following basis:

Table 1

| Row Digit | SHED LEVEL INDEX |
|---|---|
| 0 | $i < .10$ |
| 2 | $.10 \leq i < .11$ |
| 4 | $.11 \leq i < .12$ |
| 6 | $.12 \leq i < .13$ |
| 8 | $.13 \leq i < .14$ |
| A | $.14 \leq i < .15$ |
| C | $.15 \leq i < .16$ |
| E | $.16 \leq i$ | where: $i = \dfrac{\text{SUM OF FIRST NINE LINES IN REGISTER 15}}{\text{SUM OF ALL NINETY LINES IN REGISTER 15}}$ The specific shed level numbers stored in the matrix locations 17 have been selected primarily on the basis of expected "worst case" and "best case" operating conditions. The worst case situation exists when the power consumption is increasing at a maximum possible rate and the loads must be shed at very low levels in order to maintain total consumption below the DEMAND OBJECTIVE. The shed levels of from 60 to 95 percent in row E of the matrix 17 meet this worst case situation. The best case situation exists when the power consumption rate is almost constant and loads need only be shed when the DEMAND OBJECTIVE is nearly exceeded. The first row (0) of matrix shed levels is thus established with the shed level at row 0, column E, being set to nearly 100 percent of DEMAND OBJECTIVE. The remaining locations in the matrix 17 are spaced between the values established for rows 0 and E, with the spacing being slightly greater at lower shed levels than at high shed levels. This is because a rise in demand near the DEMAND OBJECTIVE is more critical than a similar rise at lower usage levels and better "resolution" is desired.

The microprocessor machine instructions stored in the ROM 23 direct the system elements to perform the demand controller functions. Reference is again made to the above cited publication "M6800 Microprocessor Programming Manual" for a detailed explanation of the instruction set and the programming techniques which are employed herein and which will now be described.

Referring particularly to the flow charts of FIGS. 9-15, when the system is first turned on various functions are performed to initialize the system elements as indicated by process block 118. The column digits in the successive matrix pointers 16 are then set for fixed priority as indicated by process block 119. A loop is then entered in which the system detects and counts power pulses and 60 hertz time pulses generated by the power and time input circuit 36. More specifically, if a power pulse is present as indicated by decision block 122, it is added to the number of pulses stored on line one of the demand interval shift registers 15 as indicated by process block 123. A power pulse flag is also set by a process block 124 and is not reset, or cleared, until the power pulse is absent. This flag in combination with machine instructions indicated by decision block 125 insure that the same power pulse is not counted more than once.

After checking for the power pulse the triple-throw switch 9 is checked and the indicated action is taken. More particularly, if the switch 9 is set to its "CLEAR HIGHEST PERCENT" position, RAM addresses 006A and 006B in the display register 354 are cleared as indicated by process block 126. If it is set to its "HIGHEST PERCENT" position, the HIGHEST PERCENT number stored at the same addresses in the display register 354 is coupled to the display 8 as indicated by process block 127, and if it is in its middle position, the "PRESENT POWER CONSUMPTION" number stored at RAM addresses 006C, 006D and 006E in the display register 354 is coupled to the display 8 as indicated by process block 128.

The presence of a 60 hertz timing pulse is tested next as indicated by decision block 129. If no pulse is present, the system loops back to decision block 122. If a 60 hertz timing pulse is detected, however, the contents of the rotation timer 18 is incremented one count as indicated by process block 130. A 60 hertz flag is also set as indicated by process block 131 to insure that each pulse is counted only once. The interval timer 355 is then incremented as indicated by process block 132 and a determination is then made as to whether a time increment equal to one ninetieth of the demand interval has elapsed. This is accomplished by inputting the DEMAND INTERVAL in minutes from the thumbwheel switches 14 as indicated by process block 133 and then calculating the number of 60 hertz timing pulses per time increment as indicated by the process block 134. This calculation is as follows:

$$PPTS = \dfrac{\text{DEMAND INTERVAL} \times 3600}{90}$$

As indicated by decision block 135, the contents of the interval timer 355 is then compared with this calculated value and if it is equal to it or greater, a time increment has elapsed. Otherwise, the system loops back to decision block 122 to await receipt of further power and timing pulses.

If a time increment has elapsed, the priority switch 5 is examined next to determine whether rotating priority has been selected. If so as determined by decision block 136, the "SCHED TIME" is inputted from the thumbwheel switch 6 and compared with the contents of the load rotation timer as indicated by decision block 137. The SCHEDULE TIME, which is in minutes, is converted to 60 hertz time pulses by multiplying it by 3600. If the rotation time has expired, the column digits in the eight matrix pointers 16 are rotated one place and the output image 19 is rotated one place to effectively rotate the priority of the eight loads connected to the demand controller as indicated by process block 138.

Figure 12:
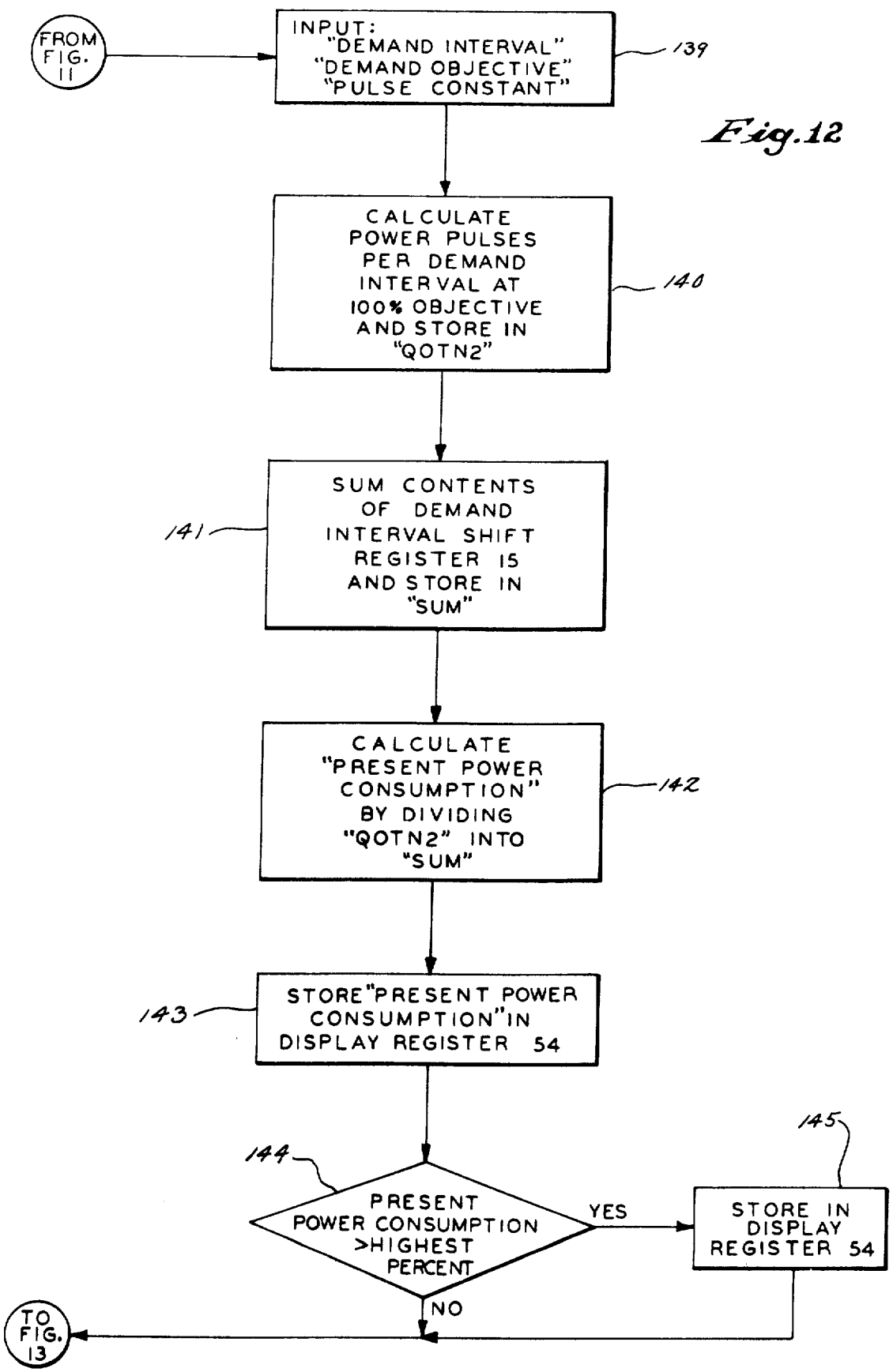

As indicated by successive process blocks 139-143 in FIG. 12, the PRESENT POWER CONSUMPTION is calculated next and stored in the display register 354 at RAM addresses 006C, 006D and 006E. The DEMAND INTERVAL, DEMAND OBJECTIVE and the PULSE CONSTANT are first inputted from the switch input circuits 39 and the number of power pulses for a DEMAND INTERVAL at 100 percent of the DEMAND OBJECTIVE is calculated as follows:

$$QOTN2 \leftarrow \dfrac{\text{DEMAND OBJECTIVE} \times 60}{\text{PULSE CONSTANT} \times \text{DEMAND INTERVAL}}$$

The contents of all ninety lines of the demand interval shift registers 15 are then summed and the PRESENT POWER CONSUMPTION is calculated therefrom by dividing this sum by the contents of QOTN2. This value is compared with the HIGHEST PERCENT stored in the display register 354, as indicated by decision block 144, and if it is greater, the PRESENT POWER CONSUMPTION is stored in place of that number as indicated by process block 145.

Figure 13:
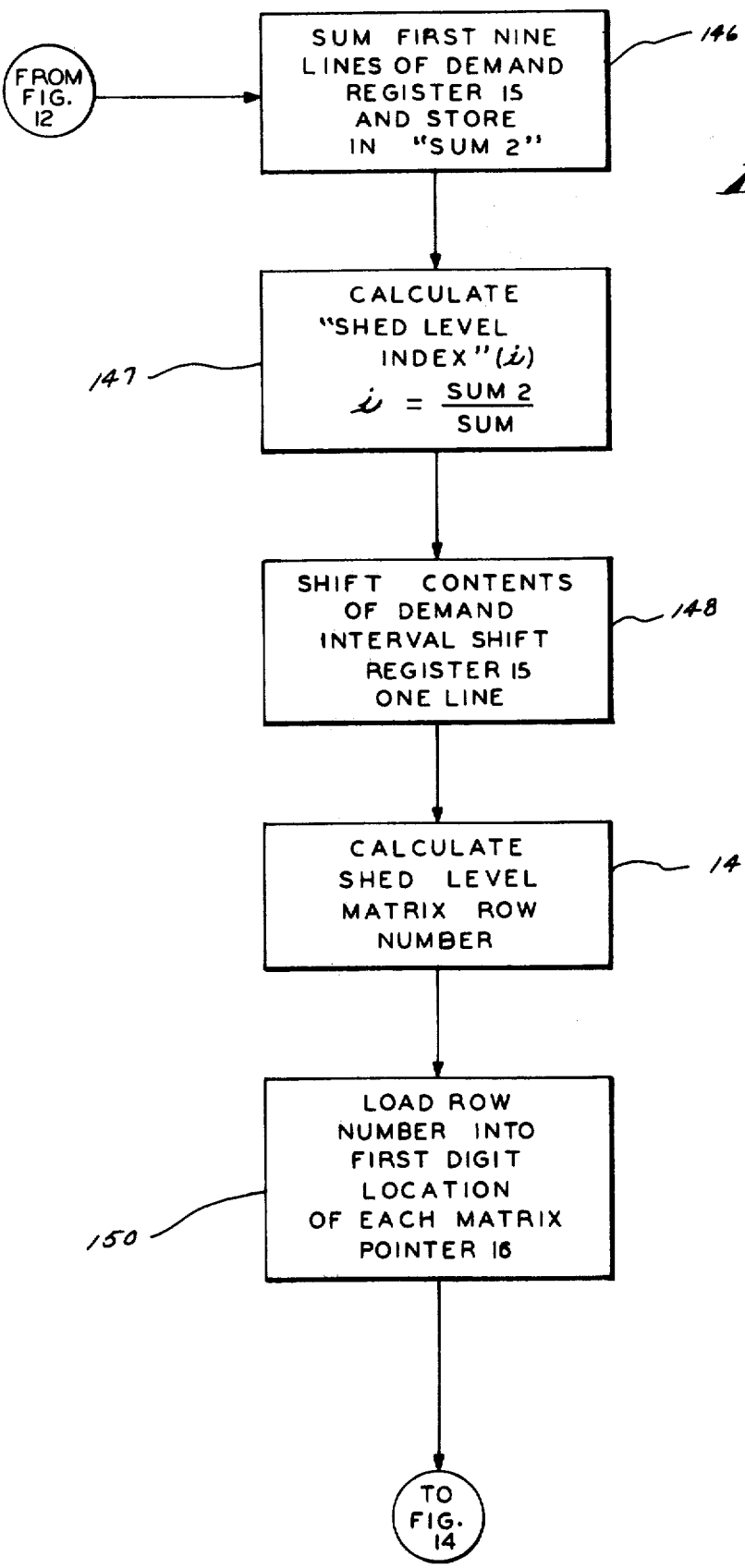

Referring particularly to FIG. 13, the shed level index (i) is calculated next by first summing the contents of the first nine lines of the demand interval register 15 as indicated by process block 146. The shed level index (i) is then calculated by dividing this sum by the previously calculated sum off all 90 lines of the register 15 as indicated by process block 147. The contents of the demand interval shift register 15 are then shifted one line as indicated by process block 148, by sequentially reading out of the RAM 22 the contents of each line therein and writing it back into the RAM 22 at the next highest address.

The shed level index (i) is next employed to calculate the row number which is to be inserted in the matrix pointers 16. As shown by process block 149, this calculation is made by comparing the shed level index (i) with the constants listed above in Table 1 and selecting the appropriate row number (0, 2, 4, 6, A, C or E) accordingly. As indicated by process block 150, the selected row number is stored as the first digit of each matrix pointer 16 to in effect complete the selection of the proper shed level for each of the eight controlled loads.

Figure 14:
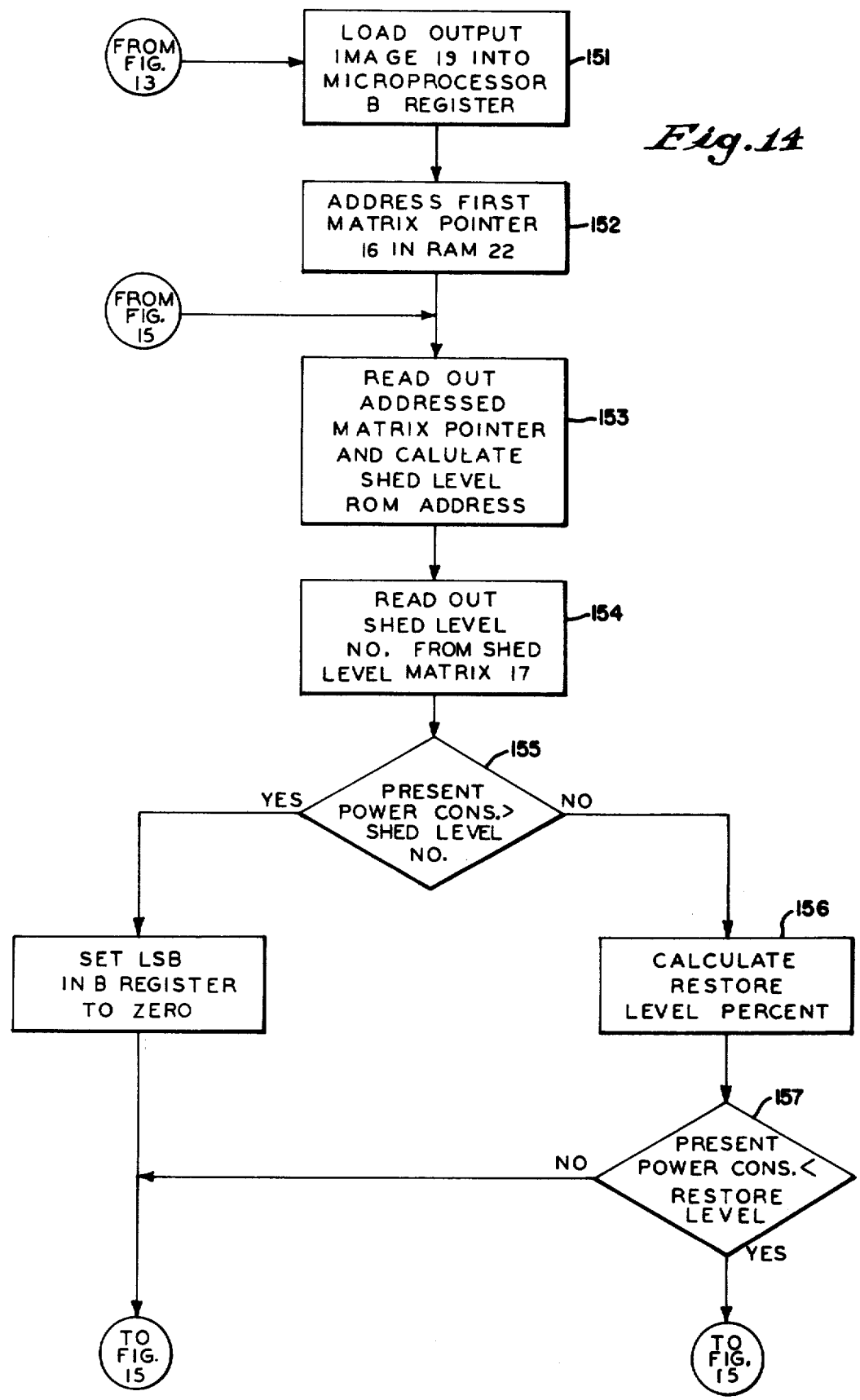
Figure 15:
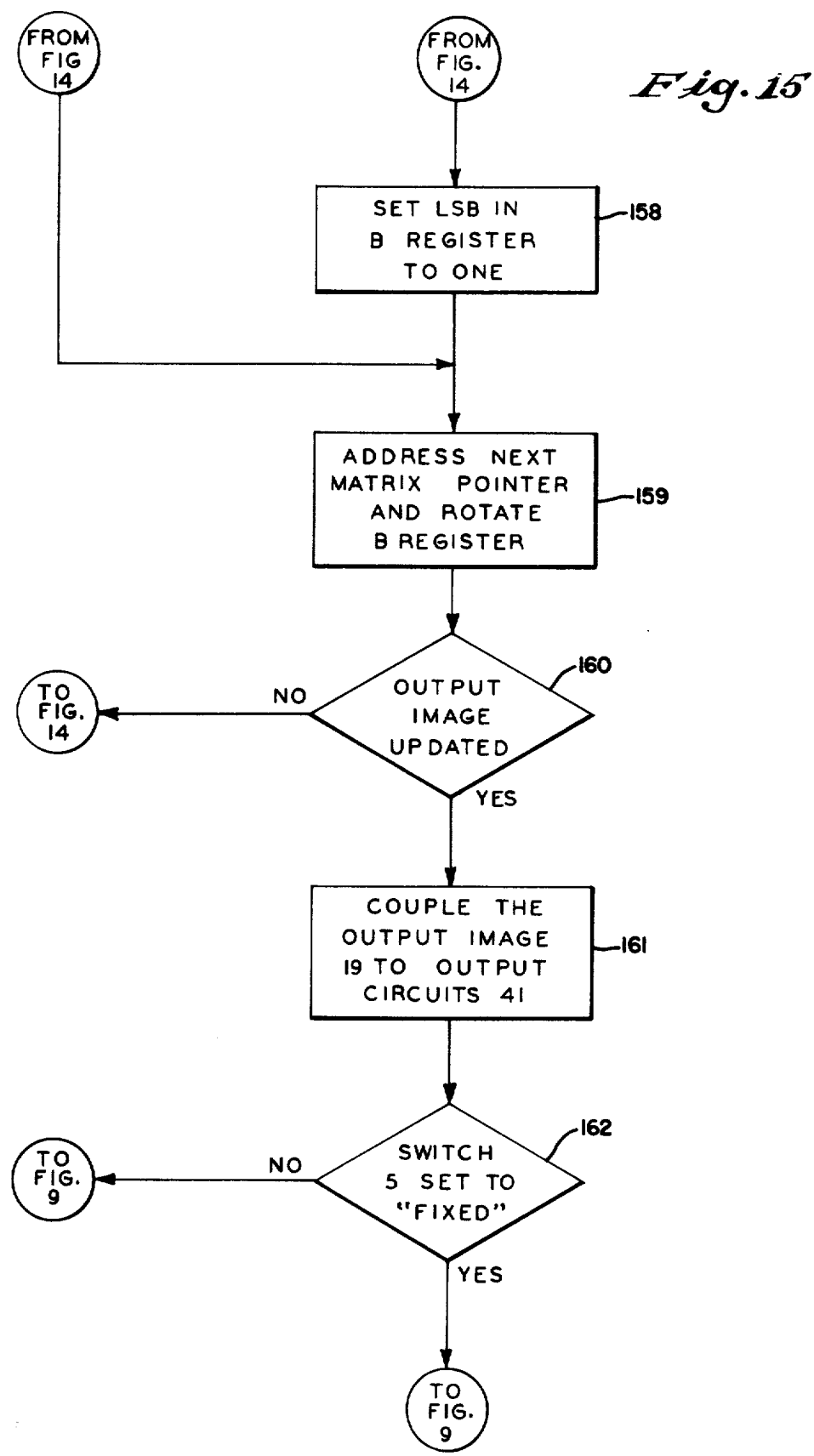

Referring to FIGS. 14 and 15, the remainder of the stored machine instructions operate the system to set the status of the eight bits in the output image 19. As shown by process blocks 151 and 152, the output image 19 is read out of the RAM 22 and stored in the microprocessor B register and the RAM address of the first matrix pointer 16 is generated on the address bus 29. The addressed matrix pointer 16 is then read out of the RAM 22 as indicated by process block 153 and the two digits therein are employed to calculate the ROM address of the selected shed level number in the matrix 17. Rather than storing each element of the matrix 17 illustrated in FIG. 8, its symmetry is exploited and only the following shed level numbers are stored:

| Address (hexadecimal) | Contents | Address (hexadecimal) | Contents |
|---|---|---|---|
| OFE0 | 60 | OFEF | 00 |
| OFE1 | 00 | OFF0 | 96 |
| OFE2 | 68 | OFF1 | 00 |
| OFE3 | 00 | OFF2 | 97 |
| OFE4 | 75 | OFF3 | 00 |
| OFE5 | 00 | OFF4 | 97 |
| OFE6 | 81 | OFF5 | 50 |
| OFE7 | 00 | OFF6 | 98 |
| OFE8 | 86 | OFF7 | 00 |
| OFE9 | 00 | OFF8 | 98 |
| OFEA | 90 | OFF9 | 50 |
| OFEB | 00 | OFFA | 99 |
| OFEC | 93 | OFFB | 00 |
| OFED | 00 | OFFC | 99 |
| OFEE | 95 | OFFD | 50 |

The ROM address of the selected shed level number is calculated by adding the column digit in the matrix pointer 16 to the address "OFEE" and then subtracting the row digit from that result. As indicated by process block 154, the addressed shed level number is read out of the matrix 17 and it is compared with the PRESENT POWER CONSUMPTION number as indicated by decision block 155. If the present power consumption as indicated by the PRESENT POWER CONSUMPTION number exceeds the selected shed level number, the least significant bit of the output image 19 stored in the B register is set to zero to indicate that the load corresponding to the matrix pointer employed to select the shed level number is to be deenergized, or "shed".

As indicated by process block 156, if the shed level has not been exceeded, the RESTORE LEVEL is calculated by subtracting from the selected shed level number the setting on the SHED-RESTORE DIFF switch 4. The PRESENT POWER CONSUMPTION number is then compared with the resulting RESTORE LEVEL as indicated by decision block 157 to ascertain whether power consumption has dropped below the selected RESTORE LEVEL. If so, as indicated by process block 158, the least significant bit in the B register is set to "1" to indicate that the associated load is to be energized, or "restored." In any event the next matrix pointer 16 is addressed and the output image 19 in the B register is rotated as indicated by process block 159 to bring the status bit which is associated with the newly addressed matrix pointer 16 into the least significant bit location. The system loops back to process block 153 in FIG. 14 until all eight bits in the output image 19 have been processed as indicated by decision block 160. The newly updated output image is then coupled to the output circuits 41 which drive the controlled loads as indicated by process block 161.

Figure 9:
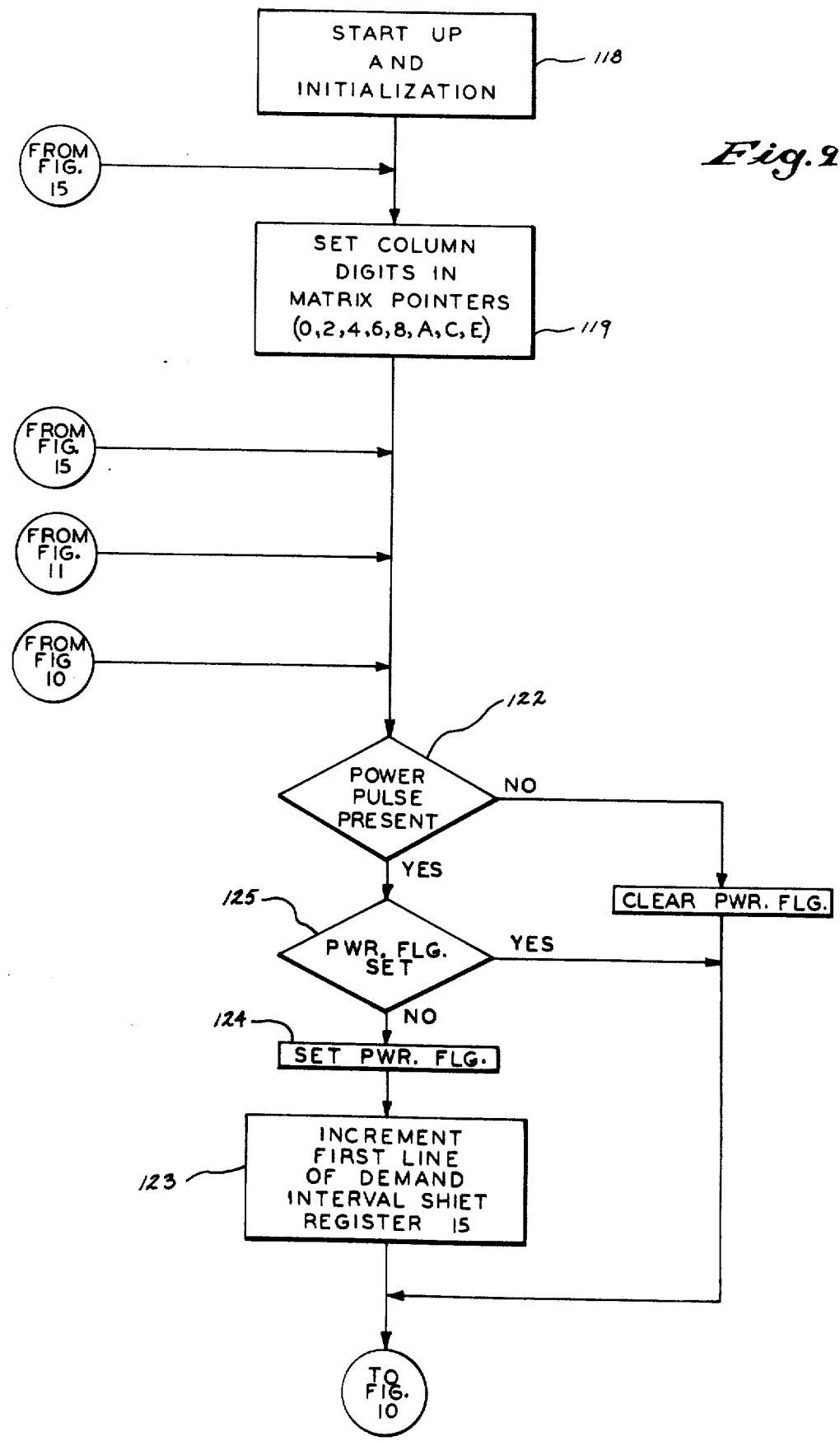
Figure 10:
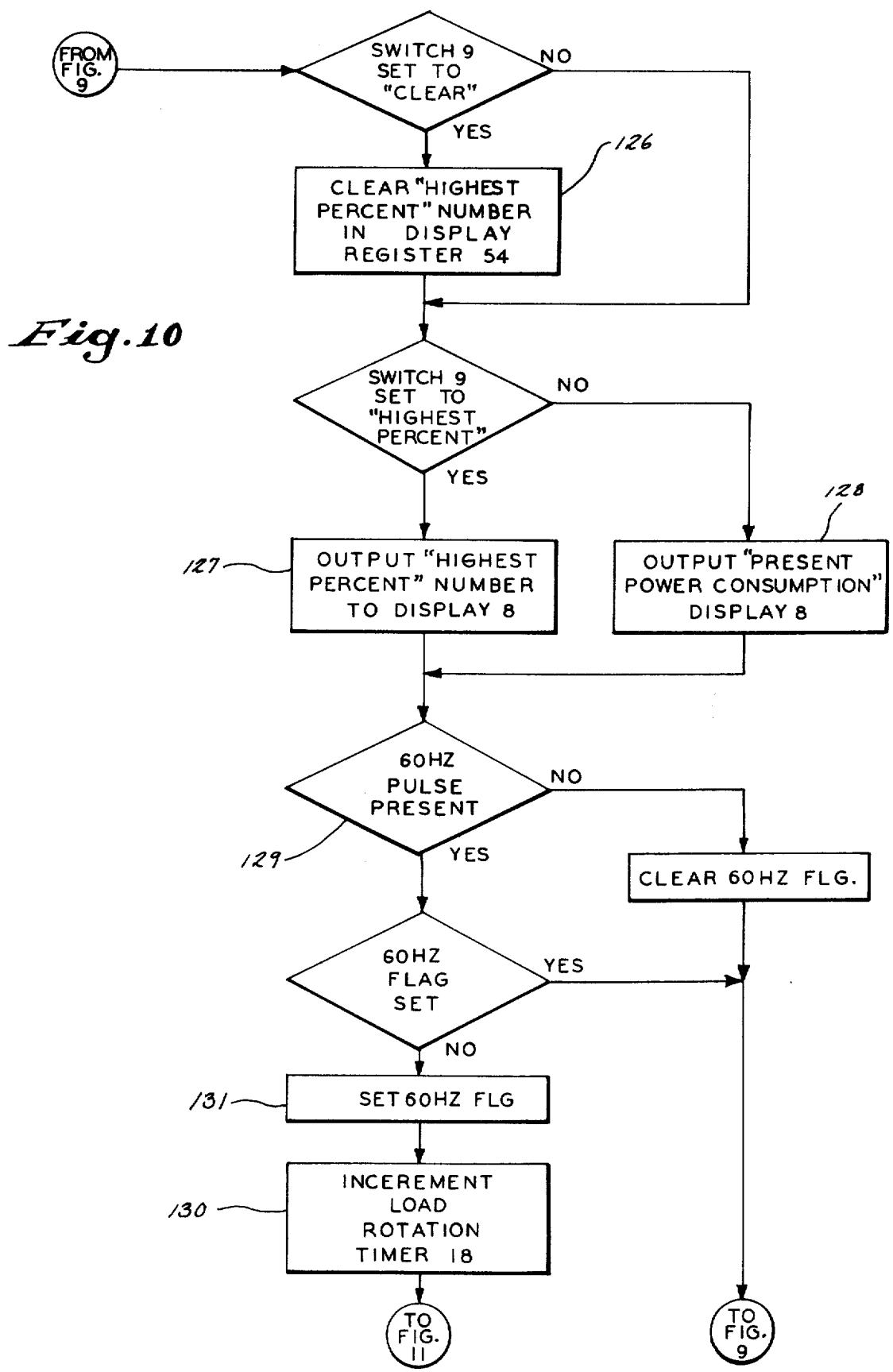
Figure 11:
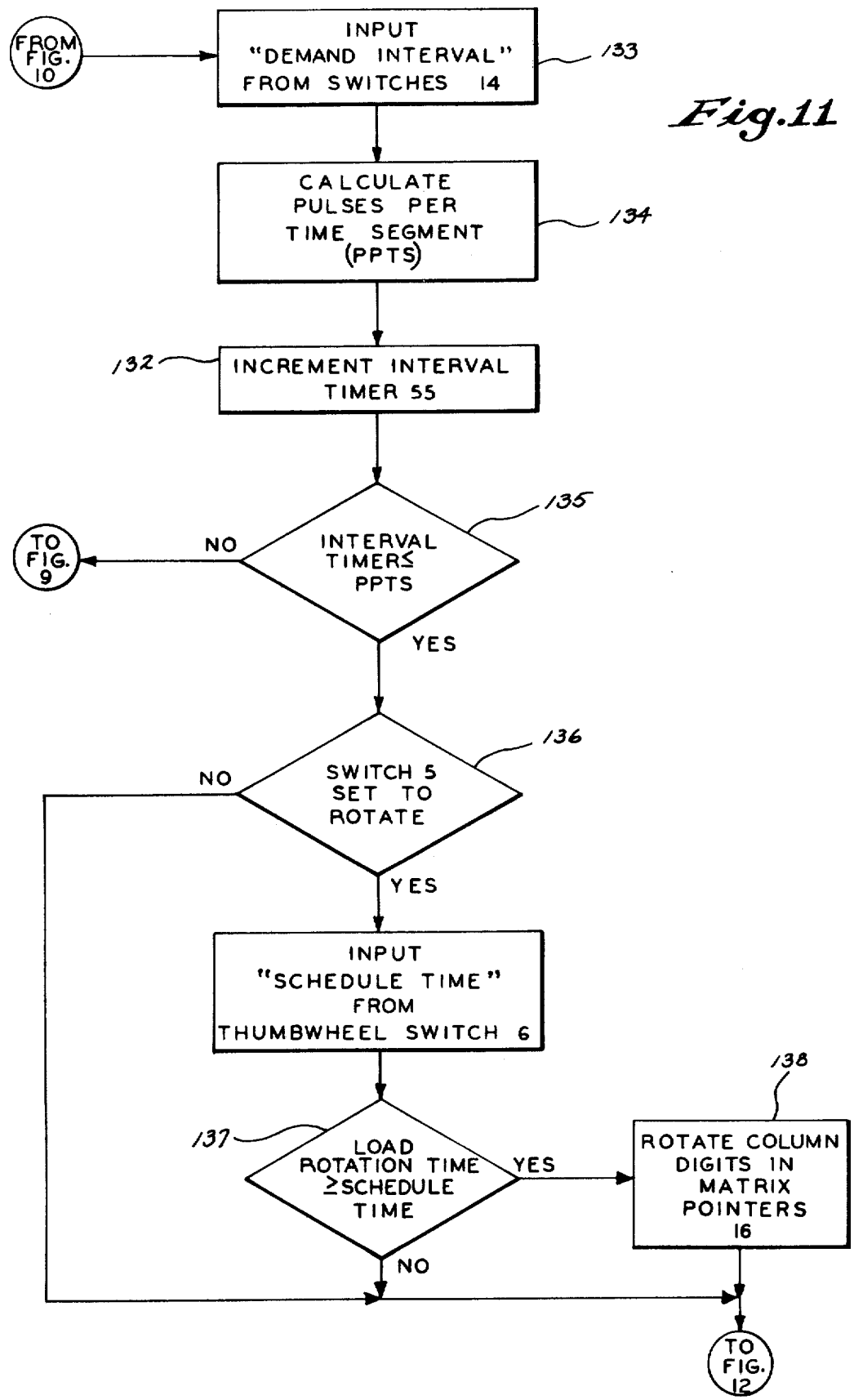

As indicated by decision block 162, the system now loops back to the beginning of the program illustrated in FIG. 9. If the "PRIORITY" thumbwheel switch 5 is set to "FIXED," the system re-enters at process block 119; otherwise, it enters at decision block 122.

A preferred embodiment of the invention has been described and it should be apparent to those skilled in the art that a number of variations can be made from this preferred embodiment without departing from the spirit of the invention.

I claim:

1. A demand controller the combination comprising:
    input circuit means for generating a signal indicative of the power consumed by external load devices;
    output circuit means for controlling the operation of one of said external loads in response to a received status signal;
    means coupled to said input circuit means for calculating a shed level index having a magnitude which is a function of the rate at which the power consumption of said external load devices is changing;
    means storing a set of shed level numbers for said one external load, each shed level number being indicative of a level of power consumption by said external load devices at which said one external load is to be deenergized;
    means coupled to said shed level index calculating means and said shed level storage means for selecting one of said plurality of stored shed level numbers, said selection being determined by the magnitude of said calculated shed level index;
    means coupled to said shed level selection means and said input circuit means for comparing the level of power consumption indicated by said selected shed level number with the level of power consumption of said external load devices; and
    means coupled to said comparing means and said output circuit means for generating a status signal to said output circuit means indicating that said one external load is to be deenergized when the level of power consumption of said external load devices exceeds the level of power consumption indicated by said selected shed level number.

2. The demand controller as recited in claim 1 in which a plurality of said external load devices are controlled by said output circuit means and in which there is a set of selectable shed level numbers for each of said controlled loads, and said selecting means is operable in response to said calculated shed level index to select one of said shed level numbers in each of said sets.

3. The demand controller as recited in claim 2 which includes means for assigning each of said sets of stored shed level numbers with one of said controlled external load devices and means for periodically changing said assignments.

4. A demand controller, the combination comprising:
a processor;
an address bus connected to said processor;
a data bus connected to said processor;
an interface circuit connected to said address bus and said data bus, said interface circuit being responsive to selected addresses generated on said address bus to couple data on said data bus between said processor and one of a plurality of input/output channels;
a control panel having a plurality of manually operable switches for generating electrical signals indicative of numbers, each of said switches being connected to designated input/output channels on said interface circuit;
a power input circuit for receiving a signal indicative of the power being consumed by external load devices, said power input circuit being connected to a designated input/output channel on said interface circuit;
a plurality of output circuits connected to a designated input/output channel on said interface circuit, each of said output circuits being operable to energize or deenergize one of said external load devices in response to a status signal received from said interface circuit;
a demand interval shift register coupled to said address bus and said data bus, said demand interval shift register having a plurality of lines for storing multibit numbers indicative of the power consumed by said external loads;
a shed level matrix coupled to said data bus and said address bus, said shed level matrix storing at separate addresses a plurality of shed level numbers;
matrix pointer storage means coupled to said data bus and said address bus, said matrix pointer storage means storing a matrix pointer for each of said output circuits, which pointer includes a number indicative of the address of a selected one of said shed level numbers; and
a memory which stores a set of processor machine instructions which direct the processor to generate addresses on said address bus and couple data between said interface circuit, said demand interval shift register, said shed level matrix and said matrix pointer storage means and in which selected ones of said stored machine instructions direct said processor to calculate a shed level index from which the numbers stored in said matrix pointer storage means are calculated.

5. The demand controller as recited in claim 4 in which one of said manually operable switches generates a number indicative of the demand objective and said stored shed level numbers representing a percent of said demand objective.

6. The demand controller as recited in claim 5 in which one of said manually operable switches generates a number indicative of the demand interval and the sum of the numbers stored in said demand interval shift register is indicative of the total power consumed by said external loads during a demand interval.

7. The demand controller as recited in claim 6 which includes a display coupled to a designated input/output channel on said interface circuit which provides a visual indication of the total power consumed by said external loads.

* * * * *